(12) United States Patent
Seguchi et al.

(10) Patent No.: US 10,576,770 B2
(45) Date of Patent: Mar. 3, 2020

(54) INK JET RECORDING METHOD AND INK JET RECORDING APPARATUS

(71) Applicant: Seiko Epson Corporation, Tokyo (JP)

(72) Inventors: Kenichi Seguchi, Okaya (JP); Mitsuaki Kosaka, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/183,005

(22) Filed: Nov. 7, 2018

(65) Prior Publication Data

US 2019/0135008 A1    May 9, 2019

(30) Foreign Application Priority Data

Nov. 8, 2017   (JP) .................. 2017-215727

(51) Int. Cl.

| | |
|---|---|
| *B41M 5/00* | (2006.01) |
| *C09D 11/322* | (2014.01) |
| *C09D 11/54* | (2014.01) |
| *B41M 7/00* | (2006.01) |
| *B41J 11/00* | (2006.01) |
| *B41J 29/377* | (2006.01) |
| *C09D 11/033* | (2014.01) |
| *C09D 11/107* | (2014.01) |
| *B41J 2/165* | (2006.01) |

(52) U.S. Cl.
CPC .......... *B41M 5/0011* (2013.01); *B41J 11/002* (2013.01); *B41J 29/377* (2013.01); *B41M 5/0023* (2013.01); *B41M 7/00* (2013.01); *C09D 11/033* (2013.01); *C09D 11/107* (2013.01); *C09D 11/54* (2013.01); *B41J 2/16535* (2013.01); *B41J 2002/1655* (2013.01); *C09D 11/322* (2013.01)

(58) Field of Classification Search
CPC ..... C09D 11/54; C09D 11/322; C09D 11/033; C09D 11/107; B41J 11/002; B41M 5/0011; B41M 5/0023
USPC ................ 347/95, 100; 106/31.13, 31.33
See application file for complete search history.

(56) References Cited

U.S. PATENT DOCUMENTS

| | | | |
|---|---|---|---|
| 10,280,324 B2 * | 5/2019 | Kagata | ............... B41J 2/1433 |
| 10,370,551 B2 * | 8/2019 | Watanabe | .......... C09D 11/107 |
| 2017/0166767 A1 | 6/2017 | Watanabe et al. | |

FOREIGN PATENT DOCUMENTS

JP      2017-110182 A    6/2017

* cited by examiner

*Primary Examiner* — An H Do
(74) *Attorney, Agent, or Firm* — Harness, Dickey & Pierce, P.L.C.

(57) ABSTRACT

Provided is an ink jet recording method including heating a recording medium, attaching an aqueous ink composition to the recording medium heated in the heating by ejecting the aqueous ink composition through a nozzle, the aqueous ink composition containing water, a solvent, and resin particles, and blowing wind to a surface of the recording medium in the attaching. The resin particles include particular resin particles that are dispersed in water after leaving a mixture liquid of the particular resin particles to stand for 2 hours at 40° C. and are not dispersed in water after leaving the mixture liquid to stand for 1 hour at 80° C., the mixture liquid containing a composition of the solvent contained in the aqueous ink composition and the particular resin particles as a solid resin component in a mass ratio of 1:1.

20 Claims, 2 Drawing Sheets

INK JET RECORDING METHOD AND INK JET RECORDING APPARATUS

BACKGROUND

1. Technical Field

The present invention relates to an ink jet recording method and an ink jet recording apparatus.

2. Related Art

Ink jet recording methods are being developed quickly in various fields because an image of a high definition can be recorded by a relatively simple apparatus. In this development, various studies have been conducted on the balance between abrasion resistance and ejection stability. For example, JP-A-2017-110182 aims to provide an ink composition with which excellent abrasion resistance can be obtained and bleeding of a recorded product can be suppressed while maintaining excellent ejection stability, and discloses an ink composition. The ink composition contains a colorant, water, an organic solvent, and polymer particles. The organic solvent contains an organic solvent having a normal boiling point of 150 to 250° C., and the content of an organic solvent that is alkylpolyol having a normal boiling point of 280° C. or higher is 2.0% by mass or lower with respect to the total amount of the ink composition. The polymer particles have a core-shell structure including core polymer and shell polymer, and the glass transition temperature of the shell polymer is higher than the glass transition temperature of the core polymer.

As disclosed in JP-A-2017-110182, a technique of improving ejection stability and abrasion resistance with a design in which decrease in the ejection stability is suppressed by maintaining the dispersibility of resin in an ink attaching step and the dispersibility decreases in a subsequent heating step such that smoothing is promoted and abrasion resistance is secured is known. However, in the case of trying to improve the image quality further by more quickly drying an ink attached in the ink attaching step, it is required to further heat a recording medium by a platen heater or the like, and thus there is a limitation to maintaining an anti-clogging property while securing abrasion resistance. Further, also from the viewpoint of removing an ink that is attached to and dried on a nozzle surface by cleaning, it is desirable that the dispersibility of the resin is secured.

SUMMARY

In view of the problem described above, an advantage of some aspects of the invention is to provide an ink jet recording method and an ink jet recording apparatus which are excellent in the abrasion resistance, the image quality, and the anti-clogging property.

The inventors have carried out an intensive study to solve the problem described above. As a result, the inventors have found that drying of the ink on the recording medium can be accelerated and the problem described above can be solved by using a predetermined ink composition and performing a wind-blowing step, and thus completed the invention.

An ink jet recording method according to an aspect of the invention includes heating a recording medium, attaching an aqueous ink composition to the recording medium heated in the heating by ejecting the aqueous ink composition through a nozzle, the aqueous ink composition containing water, a solvent, and resin particles, and blowing wind to a surface of the recording medium in the attaching. The resin particles include particular resin particles that are dispersed in water after leaving a mixture liquid of the particular resin particles to stand for 2 hours at 40° C. and are not dispersed in water after leaving the mixture liquid to stand for 1 hour at 80° C., the mixture liquid containing a composition of the solvent contained in the aqueous ink composition and the particular resin particles as a solid resin component in a mass ratio of 1:1. By blowing the wind, drying of the ink can be accelerated, and thus the image quality can be improved. Further, as the resin particles, resin particles having better dispersibility at low temperature can be employed for improving the anti-clogging property, and resin particles not dispersible at high temperature and capable of forming a rigid coating film can be employed for improving the abrasion resistance of the resulting recorded product. Further, hitting position deviation can be suppressed even under influence of external disturbance in the blowing, and wipeability at the time of cleaning of the nozzle surface can be improved.

Further, the ink jet recording method according to the invention may preferably further include elements described in claims.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
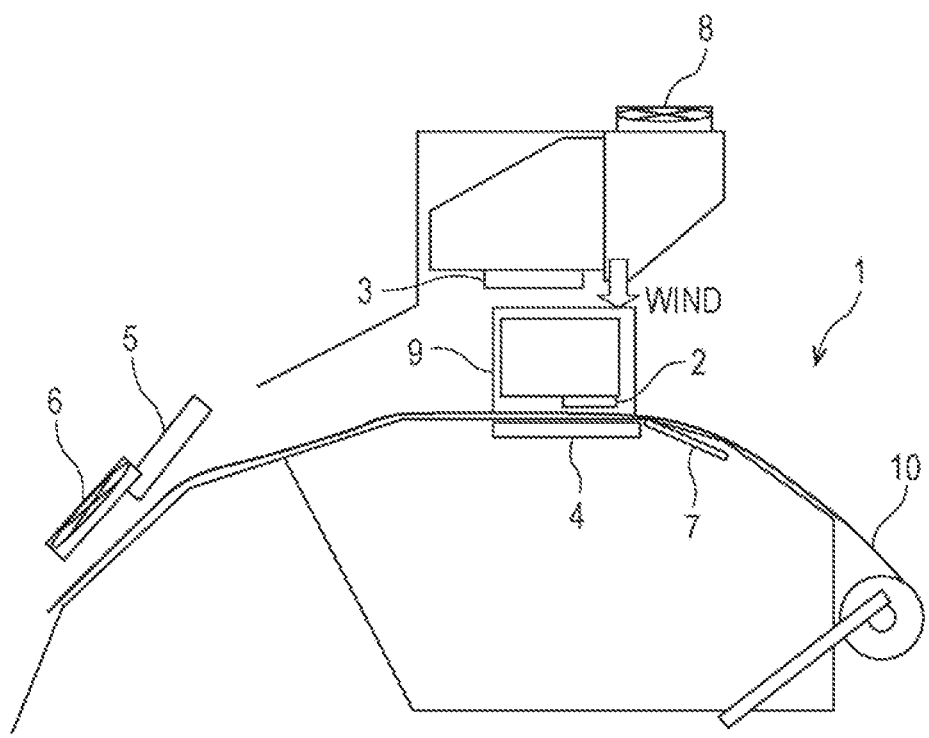
FIG. 1 is a schematic section view of a recording apparatus according to an embodiment illustrating a configuration thereof.

Although an embodiment (hereinafter referred to as "present embodiment") of the invention will be described in detail below with reference to drawings as necessary, the invention is not limited to this, and can be modified in various ways within the scope of the invention. To be noted, in the drawings, the same elements are denoted by the same reference signs, and redundant descriptions will be omitted. In addition, positional relationship between up, down, left, and right is based on the positional relationship in the drawings unless otherwise particularly described. Further, the dimensional ratios in the drawings are not limited to the illustrated ratios. To be noted, in this description, "(meth)acrylate" stands for both of acrylate and methacrylate corresponding thereto.

Ink Jet Recording Method

An ink jet recording method according to the present embodiment includes heating a recording medium, attaching an aqueous ink composition to the recording medium heated in the heating by ejecting the aqueous ink composition through a nozzle, the aqueous ink composition containing water, a solvent, and resin particles, and blowing wind to a surface of the recording medium in the attaching. The resin particles include particular resin particles that are dispersed in water after leaving a mixture liquid of the particular resin particles to stand for 2 hours at 40° C. and are not dispersed in water after leaving the mixture liquid to stand for 1 hour at 80° C., the mixture liquid containing a composition of the solvent contained in the aqueous ink composition and the particular resin particles as a solid resin component in a mass ratio of 1:1.

Heating Step

A heating step is a step of heating the recording medium. Although the heating method is not particularly limited, it is preferable to use one or more kinds selected from, for example, a conduction system of conducting heat to the recording medium from a member such as a recording medium support portion that comes into contact with the recording medium, a wind blowing system of blowing wind having heat to the recording medium by a wind blowing unit such as a fan, and a radiation system of radiating a heat-generating radiation ray such as infrared light (IR) onto the recording medium. From the viewpoint of better image quality and the like, it is preferable that an ink composition attaching step is performed on the recording medium that has been heated in the heating step and has a temperature higher than a normal temperature. The heating step is preferably performed before or in parallel with attachment of the ink composition. As an example of the conduction system, the heating step can be performed by a platen heater or a preheater. In addition, the surface temperature of the recording medium in the ink attaching step that will be described later is preferably 45° C. or lower, more preferably 40° C. or lower, and further preferably 38° C. or lower. The surface temperature of the recording medium in the ink attaching step that will be described later is preferably 25° or higher, more preferably 30° C. or higher, further preferably 32° C. or higher, and particularly preferably 35° C. or higher. By heating the recording medium, clogging caused by, for example, resin solidifying and adhering inside a nozzle is suppressed, and, since the ink that has hit the recording medium in the subsequent ink attaching step is more likely to dry, the image quality of the resulting recorded product tends to be better. Particularly, as a result of the surface temperature being 45° C. or lower, heating of an ink jet head (nozzle) is suppressed, and thus the anti-clogging property tends to be better. In addition, as a result of the surface temperature being 25° C. or higher, the embeddability of dots of the ink composition on the recording medium, particularly on an unabsorbent recording medium such as vinyl chloride, tends to be better, and the image quality tends to be better.

Recording Medium

The recording medium used in the ink jet recording method of the present embodiment is not particularly limited, and examples thereof include absorbent recording media, unabsorbent recording media, and low-absorbency recording media. Among these, a low-absorbency recording medium or an unabsorbent recording media is preferably used, and an unabsorbent recording media is more preferably used. In the unabsorbent recording medium or the low-absorbency recording medium, the embeddability is more likely to decrease due to repellency of the aqueous ink composition when the absorbency is lower. Therefore, the ink jet recording method according to the present embodiment is advantageous when used on such a recording medium.

Here, the "low-absorbency recording medium" and the "unabsorbent recording medium" are recording media whose water absorption amount from contact to 30 msec is 10 mL/m$^2$ or smaller in the Bristow method. This Bristow method is a measurement method for liquid absorption amount in a short period that is the most widely used, and is also employed by Japan Technical Association of the Pulp and Paper Industry (JAPAN TAPPI). The details of this measurement method is described in standard No. 51 "Paper and Cardboard—Liquid Absorption Measurement Method—Bristow Method" of "JAPAN TAPPI Paper and Pulp Measurement Method, ver. 2000".

In addition, the unabsorbent recording medium and the low-absorbency recording medium can be also classified by wettability for water on a recording surface. For example, the recording medium can be characterized by dripping a water droplet of 0.5 μL on a recording surface of the recording medium and measuring the decrease rate of contact angle (comparison between the contact angles at 0.5 msec and 5 sec after hitting). More specifically, regarding characteristics of the recording medium, "unabsorbent" of "unabsorbent recording medium" indicates that the above-described decrease rate is lower than 1%, and "low-absorbency" of "low-absorbency recording medium" indicates that the above-described decrease rate is 1% or higher and lower than 5%. In addition, "absorbent" indicates that the above-described decrease rate is 5% or higher. To be noted, the contact angle can be measured by using, for example, a portable contact angle meter PCA-1 (manufactured by Kyowa Interface Science Co., Ltd.).

The low-absorbency recording medium is not particularly limited, and examples thereof include coated paper provided with a coating layer for receiving an oily ink on the surface thereof. The coated paper is not particularly limited, and examples thereof include recording paper such as art paper and matte paper.

The unabsorbent recording medium is not particularly limited, and examples thereof include a plastic film not including an ink absorbing layer, and a recording medium in which a substrate such as paper is coated with plastics or a plastic film is bonded to the substrate. Examples of the plastics mentioned herein include polyvinyl chloride, polyethylene terephthalate, polycarbonate, polystyrene, polyurethane, polyethylene, and polypropylene.

Ink Attaching Step

The ink attaching step is a step of attaching an aqueous ink composition containing water, a solvent, and resin particles to the recording medium heated in the heating step by ejecting the aqueous ink composition through a nozzle. The ejection method of the aqueous ink composition is not particularly limited and a conventionally known method can be used, and examples thereof include ejecting a droplet by using vibration of a piezoelectric element, that is, forming an ink droplet by mechanical deformation of an electrostrictive element.

The distance between the nozzle surface of the nozzle and the surface of the recording medium is preferably 0.5 to 3 mm, more preferably 0.7 to 2.5 mm, further preferably 1 to 2 mm, and particularly preferably 1.3 to 1.8 mm. As a result of the distance between the nozzle surface of the nozzle and the surface of the recording medium being 3 mm or smaller, the hitting position deviation tends to be suppressed. In addition, as a result of the distance between the nozzle surface of the nozzle and the surface of the recording medium being 0.5 mm, the clogging tends to be suppressed.

Wind Blowing Step

A wind blowing step is a step of blowing wind to the surface of the recording medium in the ink attaching step. Examples of the wind blowing include blowing wind against the surface of the recording medium and also include blowing wind parallel to the surface of the recording medium. The latter is more preferable because a component evaporated from the ink can be moved away from the vicinity of the recording medium so as to promote evaporation and because unintended flow of wind is less likely to be generated.

The wind blowing is preferably performed on a recording region on the recording medium to which ink is attached. The wind blowing can remove a component of the ink composition that has evaporated from the recording region, accelerates drying of the ink composition, achieves a better image quality, and is thus preferable. The wind blowing may be performed by a wind blowing unit such as a fan. The wind blowing step may be performed as the heating step of the wind blowing system described above, or may be performed as a step separate from the heating step.

When the aqueous ink composition is ejected through the nozzle, sometimes a mist derived from the ink composition is generated in the space between the nozzle surface and the surface of the recording medium. The mist can attach to a nozzle plate to contribute to hitting position deviation and deterioration of anti-clogging property, and can decrease drying speed of the ink composition on the recording medium to cause deterioration of image quality by, for example, causing blur. However, by providing the wind blowing step, drying of the ink attached to the recording medium is accelerated, and the image quality of the resulting recorded product is improved more. In addition, by blowing wind on the recording medium, such a mist can be removed, and the wipeability at the time of cleaning is improved more.

At this time, the wind speed of the wind on the surface of the recording medium is preferably 0.5 m/sec or higher, more preferably 1 m/sec or higher, and further preferably 1.5 m/sec or higher. The image quality of the resulting recorded product tends to be improved more when the wind speed of the wind on the surface of the recording medium is 0.5 m/sec or higher. In addition, the wind speed of the wind on the surface of the recording medium is preferably 10 m/sec or lower, more preferably 5 m/sec or lower, and further preferably 3 m/sec or lower. Hitting position deviation tends to be suppressed more when the wind speed of the wind on the surface of the recording medium being 10 m/sec or lower.

Further, at this time, the temperature of the wind is preferably 45° C. or lower, more preferably 40° C. or lower, further preferably 35° C. or lower, yet further preferably 30° C. or lower, still further preferably 27° C. or lower, and particularly preferably 25° C. or lower. Clogging tends to be suppressed more and wipeability tends to be improved more when the temperature of the wind is 45° C. or lower. In addition, the temperature of the wind is preferably 20° C. or higher, and more preferably 25° C. or higher. The image quality tends to be improved more when the temperature of the wind is 20° C. or higher. In the case of setting the temperature of the wind to a temperature higher than the normal temperature, air heated by a heater can be used as the wind. Meanwhile, air not heated by a heater, that is, air of a normal temperature may be also used as the wind.

The wind speed of a wind can be measured in an attached region where the ink of the recording medium is attached in the case where the wind blows parallel to the surface of the attached region. In addition, in the case where the wind is blown against the surface of the ink-attached region of the recording medium from above, the speed of the wind hitting the recording medium can be measured on the upstream side of the wind. For example, in FIG. 1, if the former applies, the wind speed of the wind blowing parallel can be measured. If the latter applies, in the case where the wind blown out of a casing covering the fan 8 hits the surface of the ink-attached region of the recording medium from above, the wind speed can be measured in the vicinity of a wind outlet (near the word "WIND" in FIG. 1). Further, the temperature of the wind is measured at a position away from the recording medium 10 so as not to be affected by a heat source such as the surface of the recording medium 10. Specifically, for example, the temperature of the wind can be measured near the wind outlet in the case of FIG. 1.

In addition, it is preferable that, in the wind blowing step, the wind perpendicularly hits the recording medium from above at a position a little upstream of a position opposed to the head 2 on the recording medium 10, flows back toward the downstream side (side on which the head 2 is positioned) parallel to the surface of the recording medium 10, and thus flows parallel to the surface of the recording region in the ink-attached region. As a result of this, vapor at the ink attached portion moves and thus the evaporation is accelerated. Further, in the wind blowing step, it is preferable that, during scanning or at least in a part of scanning, movement of air is generated in the vicinity of the surface of the recording medium at a position at which the ink is attached.

Aqueous Ink Composition

The aqueous ink composition contains water, a solvent, and resin particles, and may contain a colorant, a surfactant, and a pigment dispersant as necessary. To be noted, in the present description, "solvent" refers to a solvent other than water. Each component will be described below. The aqueous ink composition contains water as one of main solvent components. The content of water in the composition is preferably 40% by mass or more, more preferably 50% by mass or more, further preferably 60% by mass or more, and, although the upper limit is not limited, preferably 98% by mass or less.

Resin Particles

The resin particles have an effect of improving the abrasion resistance of the image by forming a resin coating film on the recording medium to sufficiently fix the aqueous ink composition on the recording medium. The resin coating film can protect pigment and develop an adhesion property and abrasion resistance on the recording medium.

In the present embodiment, the resin particles include particular resin particles that are dispersed in water after leaving a mixture liquid of the particular resin particles to stand for 2 hours at 40° C. and are not dispersed in water after leaving the mixture liquid to stand for 1 hour at 80° C., the mixture liquid containing the solvent composition contained in the aqueous ink composition and the particular resin particles as a solid resin component in a mass ratio of 1:1 (50% by mass of the solid resin component).

To be noted, "dispersed in water after leaving the mixture liquid to stand for 2 hours at 40° C." indicates a state in which the resin particles are dispersed in water after leaving a glass container, in which the mixture liquid described above is sealed, to stand in an environment of 40° C. for 2 hours, then leaving the glass container to stand for 1 hour or longer at a normal temperature, opening the glass container, adding pure water to the mixture liquid in a mass ratio of 1:2, vertically shaking the glass container 10 times, and leaving the glass container to stand for 1 minute. In this state, no sediment of resin is generated. The water appears milky white or clouded due to the dispersed resin. Examples of this state includes a state in which resin deposited before adding the pure water and shaking is returned to this state by adding the pure water and shaking, and a state in which this state has been maintained since before adding the pure water and shaking. In the ink composition attaching step, in the case where drying of the ink composition inside the head or near the nozzle is accelerated as a result of the head receiving heat, water dries up first and the organic solvent contained in the ink composition is concentrated. In the case where the resin particles are dispersed in water after leaving the mixture liquid to stand for 2 hours at 40° C. in such a case, it is assumed that, even when drying of the ink has progressed inside the head or near the nozzle, the resin particles are more likely to be removed by flow of ink and a wiping step afterwards, and that the anti-clogging property and the wipeability are better.

In addition, "not dispersed in water after leaving the mixture liquid to stand for 1 hour at 80° C." indicates a state in which the resin particles are separated from water and deposited after leaving a glass container, in which the mixture liquid described above is sealed, to stand in an environment of 80° C. for 1 hour, then leaving the glass container to stand for 1 hour or longer at a normal temperature, opening the glass container, adding pure water to the mixture liquid in a mass ratio of 1:2, vertically shaking the glass container 10 times, and leaving the glass container to stand for 1 minute. The resin is not dispersed in water as dispersed matter, the water is separated from the resin, and the mixture liquid is not clouded or less clouded than the case where the resin is dispersed. It is assumed that the resin is dissolved such that the resin particles adhere to each other to form a large resin lump, and that thus the resin is no longer capable of being dispersed, is separated from water, and is deposited.

In a post-drying step after the ink composition attaches to the recording medium, water dries up first and the resin particles are present in the remaining organic solvent. In the case where the resin is easy to dissolve in this case, the resin particles are dissolved and adhere to each other to form a large resin lump. This resin lump cannot be dispersed in water and is separated from water, and thus the resin is deposited. It is assumed that, in the case where the resin is easy to dissolve, the resin quickly forms a film on the recording medium, thus a sufficiently flat and smooth film is formed to improve adhesion to the recording medium, leading to excellent abrasion resistance. To be noted, it is assumed that, in the case where a resin lump is generated in the ink in the ink composition attaching step, the resin lump is difficult to remove by flow of the ink or in the wiping step, and thus the anti-clogging property and the wipeability decrease.

Dispersibility after stand for 2 hours at 40° C. and dispersibility after stand for 1 hour at 80° C. can be adjusted by the combination of kind of resin particles and composition of the solvent. For example, adjustment of the kind of the resin particles can be performed by adjusting the glass transition temperature, the degree of crosslinking, and the composition such as the kind and amount of the monomer used for synthesizing the resin. For example, adjustment of the composition of the solvent can be performed by, in the case where a single kind of solvent is used, adjusting the polarity or the like of the solvent, and, in the case where a composite solvent of two or more kinds is used, by adjusting the combination of solvents, the ratio of the combination, and the like. In addition, a method of preparing resin particles formed from a homopolymer constituted only by each one of monomers constituting the resin particles, checking the state of the resin particles in the solvent composition, grasping the tendency of the state of each monomer from the results, and selecting the kinds and ratio of the monomers to be used to achieve the aimed state to design resin particles formed from a copolymer constituted by a plurality of kinds of monomers may be used.

Measurement of the dispersibility after stand for 2 hours at 40° C. and the dispersibility after stand for 1 hour at 80° C. can be performed by first preparing a mixture liquid containing the same resin particles as a resin solid component in a solution of the same solvent composition in a mass ratio of 1:1 on the basis of the combination of the resin particles and the solvent composition used in the aqueous ink composition. More specifically, an emulsion of the resin particles is separated into a solid and a liquid by a centrifuge (CS100GX manufactured by Hitachi Koki), the solid component is taken out, 10 g of the solvent (solvent composition shown in a table and contained in a corresponding ink) is added to 10 g of the solid component of the emulsion of the resin particles, and then the mixture is sufficiently stirred at a normal temperature and is then sealed in a glass container. To be noted, the resin particles may be isolated and used in the case where the resin particles can be isolated from the ink, or resin particles before preparing the ink may be used. In addition, in the case where it is possible to cause a state in which the dispersibility of the resin particles can be checked by, for example, removing colorant from the ink to be subjected to measurement, it is also possible to perform the test of dispersibility by using an ink that has undergone such pretreatment. A mixture liquid obtained in this manner is sealed in a glass container, and the glass container is left to stand for 2 hours at 40° C. or for 1 hour at 80° C., and then for 1 hour or longer at a normal temperature. After the stand, the glass container is temporarily opened to add pure water to the mixture liquid in a mass ratio of 1:2, and then the glass container is sealed again, vertically shaken 10 times, and left to stand for 1 minute. Then, the solution in the glass container is visually observed to determine, for example, whether the solution is separated into water and resin.

As described above, in the case of a condition in which the dispersibility after the stand for 2 hours at 40° C. is high (easily dispersed before ejection) and the dispersibility after the stand for 1 hour at 80° C. is low (rigid coating film can be formed after ejection), clogging and hitting position deviation are suppressed, the resin particles are likely to form a coating film after recording, and the abrasion resistance of the recorded product tends to improve more.

In addition, as another aspect of the present embodiment, a mixture solvent prepared in a ratio of 2-pyrrolidone:propylene glycol=8:2 may be used instead of the solution emulating the solvent composition of the aqueous ink composition in measurement of the dispersibility.

Examples of the resin particles include, but are not particularly limited to, homopolymers and copolymers of (meth)acrylic acid, (meth)acrylate, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluorine resins, and natural resins. Among these, (meth)acrylic resins that are homopolymers or copolymers of (meth)acrylic monomers that are any one of (meth)acrylic acid, (meth)acrylate, acrylonitrile, cyanoacrylate, and acrylamide are preferable. Among the (meth)acrylic resins, a (meth)acrylic-vinyl copolymer resin that is a copolymer of a (meth)acrylic monomer and a vinyl monomer is more preferable. To be noted, the copolymer described above may be in any form of a random copolymer, a block copolymer, an alternating copolymer, and a graft copolymer. Ejection stability and abrasion resistance tend to improve more when such resin particles are used. To be noted, the constituent ratio of the vinyl monomer in the (meth)acrylic-vinyl copolymer resin is preferably 10 to 60% by mass, more preferably 20 to 50% by mass, and further preferably 25 to 40% by mass. The anti-clogging property tends to improve more when the constituent ratio of the vinyl monomer is 10% by mass or more. In addition, The abrasion resistance tends to improve more when the constituent ratio of the vinyl monomer is 60% by mass or less. As the vinyl monomer, aromatic vinyl monomers such as styrene is preferable because the aromatic vinyl monomers are excellent in the anti-clogging property, the abrasion resistance, and the like.

In addition, a monomer having two or more polymerizable functional groups may be used. As a result of using this, crosslinkability can be imparted to the resin, and solubility of the resin can be more easily adjusted. For example, by increasing the content of the monomer, the solubility of the resin can be adjusted to a lower value. In addition, other physical properties such as the glass transition temperature can be also more easily adjusted. Examples of this include (meth) acrylic monomers and vinyl monomers having two or more functionalities.

How the resin particles described above are prepared is not particularly limited. For example, the resin particles can be obtained by a preparation method described below, and a plurality of methods may be combined as necessary. Examples of the preparation method include a method of performing polymerization (emulsion polymerization) by mixing a polymerization catalyst (polymerization initiator) and a dispersant into a monomer of a component constituting a desired resin, a method of mixing a solution obtained by dissolving a resin having a hydrophilic part in a water-soluble organic solvent into water and then removing the water-soluble organic solvent by distillation or the like, and a method of mixing a solution obtained by dissolving a resin in a water-insoluble organic solvent into an aqueous solution together with a dispersant.

In the present embodiment, the resin particles may preferably include composite resin particles. The composite resin particles are resin particles constituted by two or more kinds of resins different from each other in the configuration (at least one of the kind and content ratio) of the monomer component constituting the resins. The two or more kinds of resins may constitute any part of the resin particles. For example, the two or more kinds of resins may have a three-dimensional mesh structure. Alternatively, two or more parts apart from one another may be formed from one kind of resin. The two or more kinds of resins are not limited to those whose configurations can be discontinuously distinguished at the boundary thereof, and the configuration of the monomer component thereof may change continuously.

Particularly, a case of where core-shell resin particles in which one of the two or more kinds of resins serves as a core resin mainly constituting a center portion of the resin particles and another of the two or more kinds of resins serves as a shell resin mainly constituting a peripheral portion of the resin particles are used is preferable because the properties of resin can be varied between the peripheral portion and the center portion of the resin particles. In this case, it suffices as long as the shell resin constitutes at least part of the peripheral portion of the resin particles. Although a core-shell resin will be described as an example of the composite resin, the composite resin is not limited to the core-shell resin, and can achieve a similar effect in other forms. Core-shell resin is preferable because the degree of crosslinking and the glass transition temperature can be controlled independently for the core and the shell in the core-shell resin, and thus the solubility of the resin of the resin particles can be easily adjusted. Therefore, when a core-shell resin is used, the solubility of the resin after 1 hour at 40° C. and the solubility of the resin after 1 hour at 80° C. tend to be easy to control to respective preferable values.

In addition, dissolution time can be also adjusted when using a resin different from a core-shell resin, by the glass transition temperature and the degree of crosslinking of the resin. Further, the dissolution time can be adjusted not only by the glass transition temperature and the degree of crosslinking but also by the composition such as the kind and amount of the monomer used for synthesizing the resin.

In addition, the resin particles may be formed from a straight-chain polymer, a branched polymer, or a three-dimensionally crosslinked polymer, and the three-dimensionally crosslinked polymer is preferable among these.

The average particle diameter of the resin particles is preferably 150 to 300 nm, more preferably 155 to 290 nm, and further preferably 160 to 280 nm. The ejection stability and the abrasion resistance tend to improve more when the average particle diameter of the resin particles is within the range described above. The average particle diameter of the resin particles can be measured on the volume basis by using light scattering.

The glass transition temperature of the resin constituting the resin particles is preferably 60 to 100° C., more preferably 70 to 95° C., and further preferably 80 to 95° C. The glass transition temperature can be measured by differential scanning calorimetry (DSC).

The lower limit of the content of the resin particles is preferably 1% by mass or more, more preferably 2% by mass or more, and further preferably 3% by mass or more, with respect to 100% by mass of the aqueous ink composition. In addition, the upper limit of the content of the resin particles is preferably 10% by mass or less, more preferably 7.5% by mass or less, and further preferably 5% by mass or less, with respect to 100% by mass of the aqueous ink composition. The abrasion resistance and ejection stability of the recorded product tend to improve more when the content of the resin particles is within the range described above.

Solvent

Examples of the solvent include, but are not particularly limited to, one or more kinds selected from the group consisting of polyols, alkanediols, glycol ethers, and resin-dissolving solvents. One kind of solvent may be used alone or two or more kinds of solvent may be used together.

Examples of the polyols include, but are not particularly limited to, those including three or more hydroxyl groups for one alkane and those in which a plurality of alkanediols are bonded via ether bonding. The alkane serving as a constituent of the polyols described above is not particularly limited, but preferably has 2 to 5 carbon atoms, and more preferably has 2 to 4 carbon atoms. Examples of the polyols further include diols of alkanes having 4 or less carbon atoms. More specifically, the examples include glycerol, ethylene glycol, diethylene glycol, triethyleneglycol, polyethylene glycol, dipropylene glycol, tripropylene glycol, polypropylene glycol, 1,3-propanediol, 1,2-propanediol, and 1,4-butanediol. Moisture retention tends to improve more when such polyol is used.

Examples of the alkanediols include diols of alkanes having 5 or more carbon atoms, and diols of alkanes having 5 to 10 carbon atoms are preferable. Examples of the diols include, but are not particularly limited to, 1,2-pentanediol, 1,2-hexanediol, 1,5-pentanediol, 1,6-hexanediol, 1,7-heptanediol, and 1,8-octanediol. Solvent permeability tends to improve more when such alkanediol is used.

Examples of the glycol ethers include those in which one or two hydroxyl groups of alkylene glycols or a plurality of alkylene glycols bonded via ether bonding are etherified. The alkylene glycol serving as a constituent described above preferably has 2 to 5 carbon atoms. The ether serving as a constituent described above is preferably an alkyl ether having 1 to 4 carbon atoms. Examples of the glycol ethers include, but are not particularly limited to, alkylene glycol monoethers such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, di propylene glycol monopropyl ether, and dipropylene glycol monobutyl ether; and alkylene glycol diethers of these. Solvent permeability tends to improve more when such glycol ether is used.

Examples of the resin-dissolving solvents include, but are not particularly limited to, polar aprotic solvents such as dimethyl sulfoxide (DMSO), dimethylformamide (DMF), hexamethylphosphoramide (HMPA), pyrrolidone-based solvents, and dioxane. Examples of amide-based solvents include cyclic amides and acyclic amides. Among the cyclic amides, for example, pyrrolidone-based solvents are preferable. Among the pyrrolidone-based solvents, N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone are more preferable, and 2-pyrrolidone are further preferable. Cyclic amides are particularly preferable from the viewpoint of the anti-clogging property. Examples of the acyclic amides include N,N-dialkylalkaneamides. Examples of the N,N-dialkylalkaneamides include N,N-dialkylpropionamides. Examples of the N,N-dialkylpropionamides include 3-alkoxy-N,N-dialkylpropionamide. Examples of the 3-alkoxy-N,N-dialkylpropionamide include 3-methoxy-N,N-dimethylpropionamide and 3-butoxy-N,N-dimethylpropionamide. Acyclic amides are preferable from the viewpoint of the abrasion resistance.

In the present embodiment, in the aqueous ink composition, the content of solvent of a polyol having a normal boiling point of 280° C. or higher is preferably 1% by mass or less. As a result of this, the hitting position deviation tends to be suppressed. Examples of such a solvent include, but are not particularly limited to, glycerol. In addition, the content of the solvent is preferably 0 to 0.5% by mass and more preferably 0 to 0.1% by mass with respect to the total amount of the ink composition.

Further, in the present embodiment, in the aqueous ink composition the content of an organic solvent having a normal boiling point of 280° C. or higher being 1% by mass or less is further preferable regarding the point described above, and it is more preferable that the content is within the range described above.

The content of the solvent is preferably 10 to 40% by mass, more preferably 15 to 35% by mass, and further preferably 20 to 30% by mass, with respect to 100% by mass of the aqueous ink composition. The dispersion stability of pigment and the resin component in the ink, the continuous ejection stability, the embeddability (wet-spreadability) and permeability of the ink to the recording medium, the abrasion resistance, and the drying resistance of the ink tend to improve more when the content of the solvent is within the range described above.

The content of the resin-dissolving solvent is preferably 65 to 100% by mass, more preferably 70 to 90% by mass, and further preferably 70 to 80% by mass, when the total content of solvent is 100% by mass. With such a composition, the dispersibility after the stand for 2 hours at 40° C. and the dispersibility after the stand for 1 hour at 80° C. described above can be adjusted in a more preferable manner, and thus the effect of the invention can be more effectively obtained.

Water

The ink composition of the present embodiment is an aqueous ink composition. The content of water is preferably 50 to 90% by mass, more preferably 55 to 80% by mass, and further preferably 60 to 75% by mass, with respect to 100% by mass of the aqueous ink composition.

An aqueous ink is not absorbed in a low-absorbency or unabsorbent recording medium such as a resin film, and is repelled on the recording medium. Therefore, the aqueous ink inherently has a problem that a high-quality image having a high embeddability on an unabsorbent recording medium cannot be recorded with the aqueous ink as compared with an organic-solvent-based ink or the like. However, according to the present embodiment, an image with a higher quality can be recorded even in the case where the image is recorded on a low-absorbency or unabsorbent recording medium.

Surfactant

Examples of the surfactant include, but are not particularly limited to, acetylene glycol-based surfactants, fluorine-based surfactants, and silicone-based surfactants.

Preferable examples of the acetylene glycol-based surfactants include, but are not particularly limited to, one or more kinds selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol. Examples of commercially available products of fluorine-based surfactants include, but are not particularly limited to, OLFINE 104 series and E series such as OLFINE E1010 (product names of Air Products Japan, Inc.), and Surfynol 465 and Surfynol 61 (product names of Nissin Chemical Industry Co., Ltd.). One kind of acetylene glycol-based surfactant may be used alone, and two or more kinds of acetylene glycol-based surfactants may be used in combination.

Examples of the fluorine-based surfactants include, but are not particularly limited to, perfluoroalkylsulfonic acid salts, perfluoroalkylcarboxylic acid salts, perfluoroalkylphosphates, perfluoroalkylethylene oxide adducts, perfluoroalkylbetaines, and perfluoroalkylamine oxide compounds. Examples of commercially available products of fluorine-based surfactants include, but are not particularly limited to, S-144 and S-145 (manufactured by AGC Inc.); FC-170C, FC-430, and Fluorad-FC4430 (manufactured by Sumitomo 3M); FSO, FSO-100, FSN, FSN-100, and FS-300 (manufactured by Dupont); and FT-250 and 251 (manufactured by Neos corporation). One kind of fluorine-based surfactant may be used alone, and two or more kinds of fluorine-based surfactants may be used in combination.

Examples of the silicone-based surfactants include polysiloxane-based compounds, and polyether-modified organosiloxane. Specific examples of commercially available products of the silicone-based surfactants include, but are not particularly limited to, BYK-306, BYK-307, BYK-333, BYK-341, BYK-345, BYK-346, BYK-347, BYK-348, and BYK-349 (product names of BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names of Shin-Etsu Chemical Co., Ltd.).

The content of the surfactant is preferably 0.3 to 3% by mass, more preferably 0.5 to 2.75% by mass, and further preferably 1 to 2.5% by mass, with respect to 100% by mass of the aqueous ink composition. The image quality of the resulting recorded product, the abrasion resistance, and the ejection stability tend to improve more when the content of the surfactant is within the range described above.

Pigment

The pigment is not particularly limited, and, for example, known pigments shown below can be used.

Examples of black pigment include, but are not particularly limited to, No. 2300, No. 900, MCF88, No. 33, No. 40, No. 45, No. 52, MA7, MA8, MA100, and No. 2200B (manufactured by Mitsubishi Chemical Corporation), Raven 5750, Raven 5250, Raven 5000, Raven 3500, Raven 1255, and Raven 700 (manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (manufactured by Degussa).

Examples of white pigments include, but are not particularly limited to, C.I. pigment white 6, 18, and 21, and inorganic white pigments of titanium oxide, zinc oxide, zinc sulfide, antimony oxide, magnesium oxide, and zirconium oxide. In addition to the inorganic white pigments, organic white pigments such as white hollow resin particles and white polymer particles can be used.

Examples of pigments used for yellow ink include, but are not particularly limited to, C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments used for magenta ink include, but are not particularly limited to, C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. pigment violet 19, 23, 32, 33, 36, 38, 43, and 50.

Examples of pigments used for cyan ink include, but are not particularly limited to, C.I. pigment blue 1, 2, 3, 15, 15:1, 15:2, 15:3, 15:34, 15:4, 16, 18, 22, 25, 60, 65, and 66, and C.I. pigment vat blue 4 and 60.

In addition, examples of pigments used for color inks other than magenta, cyan, and yellow include, but are not particularly limited to, C.I. pigment green 7 and 10, C.I. pigment brown 3, 5, 25, and 26, and C.I. pigment orange 1, 2, 5, 7, 13, 14, 15, 16, 24, 34, 36, 38, 40, 43, and 63.

Examples of pearl pigments include, but are not particularly limited to, pigments having pearl luster or interference luster such as titanium dioxide-coated mica, argentine, and bismuth oxychloride.

Examples of metallic pigments include, but are not particularly limited to, particles formed from simples or alloys of aluminum, silver, gold, platinum, nickel, chromium, tin, zinc, indium, titanium, and copper.

The content of the pigment is preferably 0.1 to 30% by mass, more preferably 0.2 to 20% by mass, and further preferably 0.2 to 5% by mass, with respect to 100% by mass of the aqueous ink composition.

Other Resins

The aqueous ink composition of the present embodiment may contain another resin such as a pigment dispersant. Examples of the pigment dispersant include, but are not particularly limited to, polyvinyl alcohols, polyvinylpyrrolidones, polyaclylic acid, aclylic acid-acrylonitrile copolymer, vinyl acetate-acrylate copolymer, acrylic acid-acrylate copolymer, styrene-acrylic acid copolymer, styrene-methacrylic acid copolymer, styrene-methacrylic acid-acrylate copolymer, styrene-α-methylstyrene-acrylic acid copolymer, styrene-α-methylstyrene-acrylic acid-acrylate copolymer, styrene-maleic acid copolymer, styrene-maleic anhydride copolymer, vinylnaphthalene-acrylic acid copolymer, vinylnaphthalene-maleic acid copolymer, vinyl acetate-maleate copolymer, vinyl acetate-crotonic acid copolymer, vinyl acetate-acrylic acid copolymer, and salts of these. Among these, styrene-acrylic acid copolymer is preferable. The copolymer may be used in any form among random copolymer, block copolymer, alternating copolymer, and graft copolymer.

Other Components

Various additives such as a dissolution auxiliary, a viscosity adjuster, a pH adjuster, an antioxidant, a preservative, an antifungal agent, a corrosion inhibitor, and a chelating agent for capturing metal ions that affect dispersion may be appropriately added to the aqueous ink composition used in the present embodiment to maintain good storage stability and good ejection stability from the head, address clogging, or preventing deterioration of the ink.

Drying Step

The ink jet recording method of the present embodiment may include a drying step (also referred to as a post-drying step) of drying the recording medium to which the aqueous ink composition is attached after the ink attaching step. As a result of this, the resin contained in the aqueous ink composition on the recording medium melts, and a recorded product having a good embeddability can be formed. The drying step may be the final step for completing the recorded product such that the recorded product is good for use. The surface temperature of the recording medium in the drying step is preferably 50 to 150° C., more preferably 60 to 120° C., and further preferably 70 to 100° C. The abrasion resistance tends to improve when the drying temperature is within the range described above.

Ink Jet Recording Apparatus

The ink jet recording apparatus of the present embodiment is not particularly limited as long as the ink jet recording apparatus performs recording by the ink jet recording method described above, includes a heater that heats a recording medium, a nozzle through which an aqueous ink composition is ejected onto the recording medium, and a wind blowing unit that blows wind to the recording medium. FIG. 1 is a schematic section view of the recording apparatus according to the present embodiment. As illustrated in FIG. 1, a recording apparatus 1 includes a recording head 2, an infrared (IR) heater 3, a platen heater 4, a drying heater 5, a cooling fan 6, a preheater 7, and a fan 8.

The recording head 2 ejects an ink composition toward a recording medium. A conventionally known system can be used for the recording head 2, and examples thereof include a head that ejects a droplet by using vibration of a piezoelectric element, that is, forms an ink droplet by mechanical deformation of an electrostrictive element. The IR heater 3 and the platen heater 4 mainly heat the recording medium 10, but can also heat the recording head. The IR heater 3 can heat the recording medium from the recording head 2 side.

In addition, the platen heater 4 can heat the recording medium from the side opposite to the recording head 2 side. The drying heater 5 dries the recording medium to which the ink composition is attached. As a result of heating the recording medium on which an image has been recorded, moisture and so forth contained in the ink composition evaporates and scatters more quickly, and a coating film is formed by polymer particles contained in the ink composition. In this manner, a dried product of the ink strongly fixes (adheres) onto the recording medium, and thus a high-quality image excellent in abrasion resistance can be obtained in a short time. During the recording, the recording medium 10 is transported from right to left in FIG. 1.

The recording apparatus 1 may include the cooling fan 6. When the ink composition on the recording medium is cooled by the cooling fan 6 after drying, there is a tendency that a coating film having good adhesion to the recording medium can be formed.

In addition, the recording apparatus 1 may include the preheater 7 that heats (preheats) the recording medium in advance before the ink composition is ejected onto the recording medium. When the recording medium is preheated before ejecting the ink composition, there is a tendency that a high-quality image having less blur can be formed on the recording medium, particularly an unabsorbent or low-absorbency recording medium.

The recording head 2 is mounted on a carriage 9. The carriage 9 performs scanning (main scanning) to eject the ink composition from the head while moving in a front-rear direction in FIG. 1 to attach the ink composition to the recording medium to which the head is opposed. Recording is performed by alternately performing the scanning and transport (sub scanning) of the recording medium 10. That is, a multi-pass recording method in which recording is performed by performing scanning a plurality of times is used.

Figure 2A:
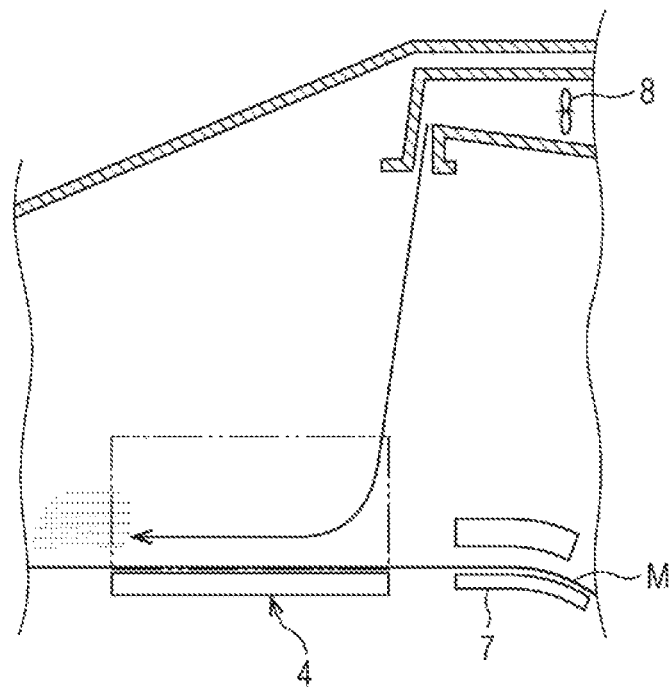
FIGS. 2A and 2B are partial side views of the recording apparatus in an ink attaching step, FIG. 2A illustrating an embodiment not provided with a carriage, FIG. 2B illustrating an embodiment provided with a carriage.
Figure 2B:
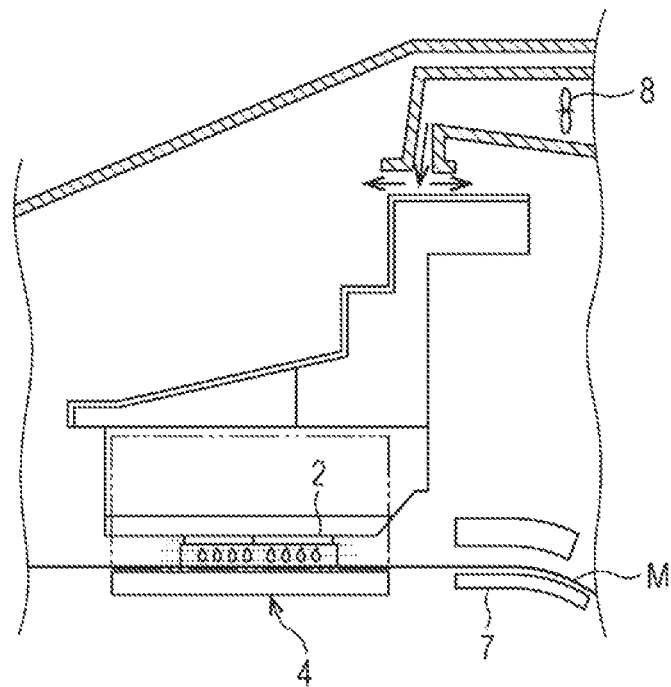

Furthermore, the recording apparatus 1 includes the fan 8 for blowing wind to the surface of the recording medium from the viewpoint of efficient drying of the ink composition and from the viewpoint of adjusting the temperature of the recording medium and the nozzle surface. To describe the fan 8 more in detail, description will be given with reference to FIGS. 2A and 2B. Also in FIGS. 2A and 2B, the recording head 2 is mounted on a carriage, and main scanning is performed by ejecting the ink composition from the head while moving in the front-rear direction in FIGS. 2A and 2B serving as a main scanning direction. In FIGS. 2A and 2B, FIG. 2A illustrates a state in which wind is blowing to the recording medium at a portion in the main scanning direction (front-rear direction in FIG. 2A) where the carriage is not present, and FIG. 2B illustrates a state in which wind is not directly blowing to the recording medium at a portion where the carriage is present.

A plurality of fans 8 are arranged along the width direction (main scanning direction) of the recording medium 10 so as to be capable of blowing a belt-like wind extending from one end to the other end of the recording medium 10 in the width direction the whole time. In FIG. 2A, the wind hits the surface of the recording medium 10. Since the hitting angle is inclined to the left in FIG. 2A with respect to the surface of the recording medium, the direction of the wind changes to the left in FIG. 2A, and the wind is delivered parallel to the recording medium to the downstream side in a recording medium transport direction in the region on the recording medium to which the ink is attached.

As a result of this, drying of the ink in the region on the recording medium to which the ink is attached can be accelerated.

In contrast, in FIG. 2B, the wind hits a wind-shielding member provided on an upper portion of the carriage, splits and changes the direction thereof to right and left in FIG. 2B, and thus does not directly hit the surface of the recording medium. As a result of this, influence of clogging and hitting position deviation caused by the wind hitting the nozzle and a dropping ink droplet can be reduced at the portion where the carriage is present.

However, the direction of the wind blown parallel to the surface of the recording medium in FIG. 2A sometimes changes slightly, and the hitting position is affected as a result of the wind blowing from the side to the recording head 2 also at the portion where the carriage is present. In addition, the wind that has hit the wind-shielding member and whose direction has been changed sometimes blows in an unintended direction in FIG. 2B, and sometimes a similar influence occurs slightly.

To be noted, the fan 8 of FIGS. 2A and 2B is merely an embodiment of a wind blowing unit that blows wind onto the recording medium, and the wind blowing unit is not limited to this as long as the wind blowing unit is capable of blowing wind to the recording medium. As other embodiments, an embodiment of making the wind outlet horizontal and blowing wind to the top layer of the recording medium and an embodiment of blowing wind from above to the ink-attached region of the surface of the recording medium can be considered.

In addition, although the recording apparatus described above uses a multi-pass recording method, a single-pass recording method in which recording is performed in one scan by using a line head having a length equal to or longer than a recording width in the width direction of the recording medium may be performed. In this case, in the wind blowing step, wind may be blown in the direction of the line head from the upstream side or the downstream side in the transport direction of the recording medium. In addition, wind may be blown against the recording medium or in a direction parallel to the surface of the recording medium on the side downstream of the head in the transport direction of the recording medium.

In addition, the ink jet recording apparatus of the present embodiment may include a wiping member that wipes the nozzle surface. Wiping may be performed by the wiping member in a state in which a cleaning liquid is attached to the nozzle or the wiping member. In the case where the cleaning liquid is used and the wiping member is an absorbent member, the cleaning liquid can be configured as an impregnating liquid, and the wiping member can be configured as a so-called cloth wiper by impregnating the absorbent member with the cleaning liquid.

Maintenance Method

A maintenance method of the present embodiment includes a wiping step of wiping the nozzle surface with the wiping member after performing recording by the ink jet recording method described above. As the wiping member, a cloth-like wiping member (cloth wiper) that comes into surface contact with a nozzle-formed surface to wipe the nozzle-formed surface or a blade-like wiping member (blade wiper) that wipes the nozzle-formed surface by an end portion of a blade can be used. Among these, a cloth wiper is preferable, and a cloth wiper impregnated with a cleaning liquid is more preferable.

The method of wiping may be a method of attaching the cleaning liquid to the nozzle surface and wiping the nozzle surface with the wiping member. Specific examples of this method include a method of wiping the nozzle surface with a wiping member to which the cleaning liquid is attached in advance and a method of attaching the cleaning liquid to the nozzle surface in advance and wiping the nozzle surface with the wiping member (cleaning liquid may or may not be attached thereto). Among these, the method of attaching the cleaning liquid to the nozzle surface in advance and wiping the nozzle surface with the wiping member is preferable from the viewpoint of cleaning efficiency. In addition, in the case of wiping the nozzle surface with the wiping member to which the cleaning liquid is attached in advance, the wiping member and the cleaning liquid may be prepared separately, and the impregnating liquid may be attached to the wiping member immediately before wiping or a wiping member to which the impregnating liquid is attached may be prepared in advance. Examples of the method of attaching the cleaning liquid to the nozzle surface or the wiping member include a spraying method, a roller method, and an immersing method. The cleaning liquid preferably includes any of water, an organic solvent, and a surfactant, and may be a mixture of these. The cleaning liquid more preferably includes either of an organic solvent and a surfactant. As the organic solvent or the surfactant, one that may be included in the ink composition described above can be used independent of the ink composition. The content of one or more of the organic solvent and the surfactant in the cleaning liquid is preferably 10% by mass or more and more preferably 20% by mass or more with respect to the total mass (100% by mass) of the cleaning liquid.

Examples of a wiping mechanism (cleaning mechanism) used in the wiping step include, but are not particularly limited to, a driving mechanism including a pressing member that relatively presses the wiping member and the nozzle surface against each other. In addition, this driving mechanism may perform a cleaning operation of relatively moving at least one of the wiping member and the head with respect to the other and removing the ink composition attached to the nozzle surface with the wiping member.

The wiping step may be performed each time successive printing is completed or may be performed in the middle of the successive printing by stopping the printing. In addition, as long as the wiping step of the present embodiment is provided, the cleaning liquid does not need to be used in every step thereof, and cleaning that does not use the cleaning liquid may be used together. In addition, from the viewpoint of a cleaning resuming property, the wiping direction is preferably parallel to the transport direction of the recording medium. Further, is it preferable to perform wiping by reciprocating the wiping member in a direction parallel to the transport direction of the recording medium.

EXAMPLES

The invention will be described in more detail below by using examples and comparative Examples. The invention should not be limited in any way by the following examples.

Material for Ink Composition

Main materials for the ink composition used in examples and comparative examples shown below are as follows.
Colorant
  C.I. pigment blue 15:3
Pigment Dispersant
  Styrene-acrylic acid-based resin dispersant
Resin Particles
  Resin particles 1 to 7 were prepared in accordance with production examples shown below.
  Resin particle 8: polycarbonate-based urethane resin
  Resin particle 9: polycarbonate-based urethane resin
Solvent
  2-pyrrolidone
  3-methoxy-N,N-dimethylpropionamide
  Propylene glycol
  1,3-butanediol
  1,2-hexanediol
Surfactant
  BYK-348 (product name of BYK Japan KK)

Production Example of Resin Particle 1

A reaction vessel was equipped with a dripping apparatus, a thermometer, a water-cooled circulation condenser, and a stirrer, 100 parts of ion-exchange water was charged in the reaction vessel, 0.2 parts of potassium persulfate serving as a polymerization initiator was added to the system at 70° C. in a nitrogen atmosphere while stirring the ion-exchange water, and a monomer solution consisting of 7 parts of ion-exchange water, 0.05 parts of sodium lauryl sulfate, 37 parts of styrene, 35 parts of n-butyl acrylate, and 0.02 parts of t-dodecyl mercaptan was dripped to the system at 70° C. to cause reaction to prepare first resin particles. Then, 2 parts of 10% solution of ammonium persulfate was added to the system, the system was stirred, further a reaction liquid consisting of 30 parts of ion-exchange water, 0.2 parts of potassium lauryl sulfate, 17 parts of methyl acrylate, 20 parts of ethyl acrylate, 30 parts of methyl methacrylate, 5 parts of acrylic acid, and 0.5 parts of t-dodecyl mercaptan was added to the system at 70° C. while stirring the system to cause polymerization reaction, then polymerization of second resin is caused by neutralizing the system to pH of 8 to 8.5 with sodium hydroxide and filtrating the system with a 0.3 μm filter, and thus a water dispersion of composite polymer fine particles formed from the first resin and second resin was prepared. Specifically, the water dispersion was a water dispersion of core-shell resin fine particles. To be noted, the amount of added monomers described above served as the standard, and the amounts and kinds of (meth)acrylic monomers were adjusted and changed such that overall Tg of the resin was 80° C. The constituent ratio of vinyl monomer (styrene) was 26% by mass.

Differential scanning calorimetry (DSC) was performed on the composite polymer particles obtained as described above in accordance with JIS K7121 to obtain the glass transition temperature Tg (° C.) of the composite polymer particles, and the obtained Tg was 80° C. A differential scanning calorimeter "DSC6220" manufactured by Seiko Instruments Inc. was used. To be noted, measurement of the glass transition temperature Tg was the same in production examples below.

In addition, the core-shell polymer particles obtained as described above were subjected to measurement by microtrac UPA (NIKKISO CO., LTD.) to obtain a particle diameter φ (nm) of the core-shell polymer particles, and the obtained average particle diameter (based on volume) was 240 nm. To be noted, measurement of the average particle diameter was the same in production examples below.

Production Example of Resin Particles 2 to 7

Resin Particles 2 to 7 were prepared in a similar manner to the production example of Resin Particle 1 except that the monomer composition and conditions (amount of polymerization initiator, temperature, time, stirring speed, and concentration) for polymerization were changed. Water dispersions of polyurethane were used as Resin Particles 8 and 9.

The resin particles produced as described above are summarized in Table 1 below.

TABLE 1

| Resin Particle No. | Constituent ratio of vinyl monomer (% by mass) | Tg (° C.) | Chemical species | Average particle diameter (nm) |
|---|---|---|---|---|
| Resin Particle 1 | 26 | 80 | St-Ac | 240 |
| Resin Particle 2 | 26 | 65 | St-Ac | 240 |
| Resin Particle 3 | 26 | 95 | St-Ac | 240 |
| Resin Particle 4 | 26 | 80 | St-Ac | 170 |
| Resin Particle 5 | 26 | 80 | St-Ac | 280 |
| Resin Particle 6 | 5 | 80 | St-Ac | 190 |
| Resin Particle 7 | 74 | 80 | St-Ac | 180 |
| Resin Particle 8 | 0 | 120 | PU | 60 |
| Resin Particle 9 | 0 | 90 | PU | 60 |

Preparation of Aqueous Ink Composition

Pigment dispersions in which pigments were dispersed by pigment dispersant resin in water were prepared, and other materials were mixed with these in Basic Compositions 1 to 7 shown in Table 2 below and stirred sufficiently, and thus respective aqueous ink compositions (Inks 1 to 23) were obtained. Combinations of Compositions 1 to 7 and resin particles for constituting Inks 1 to 23 will be shown in Table 3 that will be shown later. In Table 2 below, the unit of numerical values is % by mass, and the sum thereof is 100.0% by mass.

shown in Table 3, 10 g of resin particles and 10 g of solvents were mixed to separately prepare mixture liquids containing resin solid components in a mass ratio of 1:1. To be noted, the solid component of the resin particles was taken out by separating the solution obtained as described above in which the resin particles were dispersed into a solid (resin particles) and a liquid (dispersant) by using a centrifuge (CS100GX manufactured by Hitachi Koki). The mixture liquids were sufficiently stirred at a normal temperature, and then sealed in glass container (100 cc sample bottles).

Then, the glass containers were left to stand for 2 hours at 40° C., and for 1 hour or longer at a normal temperature, then were opened to add pure water to the mixture liquids in a mass ratio (mixture liquid:pure water) of 1:2, were vertically shaken 10 times, and were left to stand for 1 minute. Then, the state inside the glass containers were visually observed, and it was determined that the resin did not gel and was dispersed in the case where the resin and water were not separated and no sediment of resin was observed. In this case, the water sometimes appears clouded due to the resin particles. In contrast, in the case where the resin was separated from water and a sediment of resin was observed, it was determined that the resin gelled and was not dispersed. In this case, the water separated from the resin is transparent or less clouded than in the case where the resin is dispersed. Similarly, another set of glass containers were left to stand for 1 hour at 80° C., and for 1 hour or longer at a normal temperature, then were opened to add pure water to the mixture liquids in a mass ratio (mixture liquid:pure

TABLE 2

| | | Composition 1 | Composition 2 | Composition 3 | Composition 4 | Composition 5 | Composition 6 | Composition 7 |
|---|---|---|---|---|---|---|---|---|
| Pigment (solid component) | C.I. pigment blue 15:3 | 2 | 2 | 2 | 2 | 2 | 2 | 2 |
| Pigment dispersant | Styrene-acrylic acid-based resin dispersant | 1 | 1 | 1 | 1 | 1 | 1 | 1 |
| Resin emulsion | See Table 3 | 4 | 4 | 4 | 4 | 4 | 4 | 4 |
| Solvent | 2-pyrrolidone | 20 | 16 | 14 | 14 | 12 | 8 | 7 |
| | 3-methoxy-N,N-dimethylpropionamide | | | | | | | 7 |
| | Propylene glycol | | 4 | 6 | | 8 | 12 | 6 |
| | 1,3-butanediol | | | | 3 | | | |
| | 1,2-hexanediol | | | | 3 | | | |
| Surfactant | BYK-348 | 2 | 2 | 2 | 2 | 2 | 2 | 2 |
| Water | | Rest | Rest | Rest | Rest | Rest | Rest | Rest |
| | Total | 100 | 100 | 100 | 100 | 100 | 100 | 100 |

Test of Dispersibility

By using the combinations of the resin particles and the solvent compositions respectively used for Inks 1 to 23 water) of 1:2, were vertically shaken 10 times, and were left to stand for 1 minute, and the dispersibility was evaluated in this state.

TABLE 3

| Ink No. | Resin No. | Ink composition | Solvent composition (% by mass) for dispersibility evaluation | Resin solid component (% by mass) for dispersibility evaluation | Dispersibility after 2 hours at 40° C. | Dispersibility after 1 hour at 80° C. |
|---|---|---|---|---|---|---|
| Ink 1 | Resin 1 | Composition 1 | 2-pyrrolidone: 50 | 50 | L | G |
| Ink 2 | Resin 1 | Composition 2 | 2-pyrrolidone: 40<br>Propylene glycol: 10 | 50 | L | G |
| Ink 3 | Resin 1 | Composition 3 | 2-pyrrolidone: 35<br>Propylene glycol: 15 | 50 | L | G |
| Ink 4 | Resin 1 | Composition 7 | 2-pyrrolidone: 17.5<br>3-methoxy-N,N-dimethylpropionamide: 17.5<br>Propylene glycol: 15 | 50 | L | G |

TABLE 3-continued

| Ink No. | Resin No. | Ink composition | Solvent composition (% by mass) for dispersibility evaluation | Resin solid component (% by mass) for dispersibility evaluation | Dispersibility after 2 hours at 40° C. | Dispersibility after 1 hour at 80° C. |
|---|---|---|---|---|---|---|
| Ink 5 | Resin 1 | Composition 4 | 2-pyrrolidone: 35<br>1,3-butanediol: 7.5<br>1,2-hexanediol: 7.5 | 50 | L | G |
| Ink 6 | Resin 2 | Composition 2 | 2-pyrrolidone: 40 | 50 | L | G |
| Ink 7 | Resin 3 | Composition 2 | Propylene glycol: 10 | 50 | L | G |
| Ink 8 | Resin 4 | Composition 2 | | 50 | L | G |
| Ink 9 | Resin 5 | Composition 2 | | 50 | L | G |
| Ink 10 | Resin 1 | Composition 5 | 2-pyrrolidone: 30<br>Propylene glycol: 20 | 50 | L | L |
| Ink 11 | Resin 1 | Composition 6 | 2-pyrrolidone: 20<br>Propylene glycol: 30 | 50 | L | L |
| Ink 12 | Resin 6 | Composition 1 | 2-pyrrolidone: 50 | 50 | G | G |
| Ink 13 | Resin 6 | Composition 2 | 2-pyrrolidone: 40<br>Propylene glycol: 10 | 50 | G | G |
| Ink 14 | Resin 6 | Composition 5 | 2-pyrrolidone: 30<br>Propylene glycol: 20 | 50 | G | L |
| Ink 15 | Resin 6 | Composition 6 | 2-pyrrolidone: 20<br>Propylene glycol: 30 | 50 | G | L |
| Ink 16 | Resin 7 | Composition 1 | 2-pyrrolidone: 50 | 50 | L | L |
| Ink 17 | Resin 7 | Composition 2 | 2-pyrrolidone: 40<br>Propylene glycol: 10 | 50 | L | L |
| Ink 18 | Resin 7 | Composition 5 | 2-pyrrolidone: 30<br>Propylene glycol: 20 | 50 | L | L |
| Ink 19 | Resin 7 | Composition 6 | 2-pyrrolidone: 20<br>Propylene glycol: 30 | 50 | L | L |
| Ink 20 | Resin 8 | Composition 1 | 2-pyrrolidone: 50 | 50 | G | G |
| Ink 21 | Resin 8 | Composition 2 | 2-pyrrolidone: 40<br>Propylene glycol: 10 | 50 | G | G |
| Ink 22 | Resin 9 | Composition 1 | 2-pyrrolidone: 50 | 50 | G | G |
| Ink 23 | Resin 9 | Composition 2 | 2-pyrrolidone: 40<br>Propylene glycol: 10 | 50 | G | G |

*G: not dispersed in water
L: dispersed in water

Ink Jet Recording Apparatus

SC-S80650 (manufactured by Seiko Epson Corporation) which was modified (hereinafter referred to as "modified apparatus of SC-S80650") by providing a fan to blow wind to a platen region and a cloth wiper for cleaning the nozzle surface and into which the aqueous ink composition prepared as described above was injected was used. To be noted, where the fan was disposed was as illustrated in FIGS. 2A and 2B.

In addition, the cloth wiper included an absorbent member and a driving mechanism, and a non-woven fabric of cuprammonium rayon (density: 0.01 g/cm$^2$, thickness: 4.0 mm) was used as the absorbent member. In addition, the driving mechanism was configured as a mechanism that performs a wiping operation of removing the ink composition attached to the nozzle surface by the absorbent member by pressing the absorbent member via the pressing member from the side opposite to the side to be into contact with the nozzle surface of the recording head 2 with a predetermined load to bring the absorbent member into contact with an ink-formed surface and relatively moving the absorbent member and the recording head with respect to each other. In the wiping operation, cleaning liquids (M1 and M2) shown in Table 4 below were used in an impregnated state. The cleaning liquids were impregnated into the absorbent member in advance. To be noted, in Example 17, wiping was performed in a dry state without using any cleaning liquid.

TABLE 4

| | M1 | M2 |
|---|---|---|
| Propylene glycol | — | 20 |
| Olefin E1010 | — | 0.5 |
| Water | 100 | Rest |
| Total | 100 | 100 |

Ink Jet Recording Method

A polyvinyl chloride sheet ("IJ-40" manufactured by Sumitomo 3M) was used as the recording medium. The platen heater was controlled such that the recording medium was heated to surface temperatures shown in Tables 4 and 5 in a state in which the platen heater and the fan were operated. The recording medium was supplied to the recording apparatus in this state, and the injected aqueous ink composition was ejected and attached to the heated recording medium. To be noted, the amount of attached ink was adjusted to 15 mg/inch$^2$, and a recording pattern of 5 cm×5 cm was recorded. The wind speed and wind temperature of the wind supplied by the fan were as shown in Tables 4 and 5. Air of a normal temperature was used as the wind in Examples of wind temperature of 25° C., and air heated by a heater was used as the wind in Examples of wind temperatures higher than the normal temperature. In the ink-attached region of the recording medium, the wind was blown parallel to the surface of the ink-attached region.

To be noted, in Example 13, the heating step was performed by using a heated wind in a state in which the platen heater was not operated.

In addition, the recording method described above was performed in a state in which the fan was not operated in Comparative Examples 15 and 17, and the recording method described above was performed in a state in which the platen heater was not operated in Comparative Example 16. After the ink attaching step, the recording medium was heated by a drying heater disposed downstream of the platen heater for about 1 minute at 70° C. to obtain a recorded product.

Temperature Measurement Method

The average of the surface temperature of the recording medium at a position that can face the head on the platen during the recording was used as the temperature of the recording medium.

Measurement Method of Wind Speed and Wind Temperature

The wind blown by the fan was supplied onto the recording medium in a state illustrated in FIG. 2A in which there was no wind-shielding object such as a carriage therebetween, and the wind speed thereof was measured at a position near a wind outlet on the upstream side. In addition, the wind temperature was measured at a position near the wind outlet on the upstream side so as not to be affected by the surface temperature of the recording medium or the like.

Anti-Clogging Property

In the recording method described above, a half of nozzles in an ink nozzle row were not allowed to eject the ink during recording, and recording was performed continuously for 1.5 hours. Then, suction cleaning was performed once, and the ejection state of the unused nozzles was inspected. The ratio of number of nozzles incapable of ejection after cleaning to the number of nozzles which had not performed ejection was calculated, and was evaluated in accordance with the following evaluation criteria. To be noted, when the inside of the head of a nozzle incapable of ejection was observed after the test, solidification and adhesion of resin were observed.

A: the ratio of number of nozzles incapable of ejection was 1% or lower

B: the ratio of number of nozzles incapable of ejection was higher than 1% and equal to or lower than 3%

C: the ratio of number of nozzles incapable of ejection was higher than 3% and equal to or lower than 6%

D: the ratio of number of nozzles incapable of ejection was higher than 6%

TABLE 5

| | Examples | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Ink | Ink 1 | Ink 2 | Ink 3 | Ink 4 | Ink 5 | Ink 6 | Ink 7 | Ink 8 | Ink 9 | Ink 2 | Ink 2 | Ink 2 | Ink 2 | Ink 2 | Ink 2 | Ink 2 | Ink 2 |
| Recording medium surface temperature (° C.) | 38 | 38 | 38 | 38 | 38 | 38 | 38 | 38 | 38 | 38 | 38 | 38 | 38 | 33 | 43 | 38 | 38 |
| Wind speed (m/s) | 2.5 | 2.5 | 2.5 | 2.5 | 2.5 | 2.5 | 2.5 | 2.5 | 2.5 | 0.5 | 4 | 2.5 | 2.5 | 2.5 | 2.5 | 2.5 | 2.5 |
| Wind temperature (° C.) | 25 | 25 | 25 | 25 | 25 | 25 | 25 | 25 | 25 | 25 | 25 | 35 | 40 | 25 | 25 | 25 | 25 |
| Cleaning liquid | M1 | M1 | M1 | M1 | M1 | M1 | M1 | M1 | M1 | M1 | M1 | M1 | M1 | M1 | M1 | M2 | — |
| Abrasion resistance | A | A | B | A | B | A | B | B | A | A | A | A | A | A | A | A | A |
| Anti-clogging property | C | B | A | B | A | B | A | A | B | B | A | B | C | A | C | B | B |
| Image quality | B | B | B | B | A | B | B | B | B | C | A | A | A | C | A | B | B |
| Hitting position deviation | B | B | B | B | A | B | B | B | B | A | C | B | B | B | B | B | B |
| Wipeability | C | B | A | C | A | A | B | A | B | A | C | C | C | B | B | A | C |

TABLE 6

| | Comparative Examples | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Ink | Ink 10 | Ink 11 | Ink 12 | Ink 13 | Ink 14 | Ink 15 | Ink 16 | Ink 17 | Ink 18 | Ink 19 | Ink 20 | Ink 21 | Ink 22 | Ink 23 | Ink 1 | Ink 1 | Ink 10 |
| Recording medium surface temperature (° C.) | 38 | 38 | 38 | 38 | 38 | 38 | 38 | 38 | 38 | 38 | 38 | 38 | 38 | 38 | 38 | 25 | 38 |
| Wind speed (m/s) | 2.5 | 2.5 | 2.5 | 2.5 | 2.5 | 2.5 | 2.5 | 2.5 | 2.5 | 2.5 | 2.5 | 2.5 | 2.5 | 2.5 | 0 | 2.5 | 0 |
| Wind temperature (° C.) | 25 | 25 | 25 | 25 | 25 | 25 | 25 | 25 | 25 | 25 | 25 | 25 | 25 | 25 | — | 25 | — |
| Cleaning liquid | M1 | M1 | M1 | M1 | M1 | M1 | M1 | M1 | M1 | M1 | M1 | M1 | M1 | M1 | M1 | M1 | M1 |
| Abrasion resistance | C | C | A | A | C | C | C | C | D | D | A | A | A | A | A | A | C |
| Anti-clogging property | A | A | D | D | D | D | A | A | B | B | D | D | D | D | B | A | A |
| Image quality | B | B | B | B | B | B | B | B | B | B | B | B | B | B | D | D | D |
| Hitting position deviation | B | B | B | B | B | B | B | B | B | B | B | B | B | B | A | B | A |
| Wipeability | A | A | C | C | C | C | A | A | B | B | C | C | C | C | A | B | A |

Image Quality

The recording pattern of the recorded product obtained by the recording method described above was visually observed, and the image quality was evaluated in accordance with the following evaluation criteria.

A: no unevenness in the pattern was observed, and no blur of ink was observed at the edge of the pattern B: no unevenness in the pattern was observed, but slight blur of ink was observed at the edge of the pattern C: slight unevenness was observed in the pattern D: unevenness in the pattern was obvious Abrasion Resistance The recording pattern part of the recorded product obtained by the recording method above was rubbed by an abrader formed by attaching a white cotton cloth (in accordance with JIS L 0803) to a Gakushin-Type fastness rubbing tester AB-301 (product name of a TESTER SANGYO CO., LTD.) by 60 cycles of reciprocation with a load of 330 g. Then, peeling of the recording pattern part of the recording medium was visually observed, and was evaluated in accordance with the following evaluation criteria.

A: no scratch or peeling of the recording pattern was observed, and no migration of ink to the white cotton cloth was observed B: no obvious scratch or peeling of the recording pattern was observed, but migration of ink to the white cotton cloth was observed C: obvious scratches and peeling of the recording pattern were observed D: the recording pattern was peeled off almost completely Hitting Position Deviation The nozzles were caused to record a nozzle check pattern, and the deviation of hitting position from a normal hitting position of the ink droplet was measured for each nozzle. The average value of the nozzles was calculated and evaluated in accordance with the following evaluation criteria. To be noted, test to evaluate the hitting position deviation was performed during printing in an initial state before performing the successive printing for the anti-clogging property test.

A: the position deviation was 20 or smaller when the distance between two adjacent nozzles was 100

B: the position deviation was larger than 20 and equal to or smaller than 40 when the distance between two adjacent nozzles was 100

C: the position deviation was larger than 40 when the distance between two adjacent nozzles was 100

Wipeability

Successive printing was performed for 4 hours by the recording method described above, and after finishing the successive printing, suction cleaning was performed once, 10 cm of the nozzle surface was wiped with the wiping member, and hitting position deviation of nozzles capable of ejection was checked. To be noted, since there was a tendency that more attached matter of ink was observed on the nozzle surface in the case of a lower rank, it was assumed that the attached matter of ink attaching to the vicinity of the nozzle caused deviation of trajectory of dropping ink. To be noted, under the same conditions as in Example 2 except that wiping was not performed, the following evaluation D was obtained.

A: hitting position deviation of 50 or larger was observed in 3% or less of the nozzles when the distance between two adjacent nozzles was 100

B: hitting position deviation of 50 or larger was observed in more than 4% and equal to or less than 6% of the nozzles when the distance between two adjacent nozzles was 100

C: hitting position deviation of 50 or larger was observed in more than 6% and equal to or less than 10% of the nozzles when the distance between two adjacent nozzles was 100

D: hitting position deviation of 50 or larger was observed in more than 10% of the nozzles when the distance between two adjacent nozzles was 100

Each example in which the heating step and the wind blowing step were performed and the resin particles contained in the ink included resin particles that were dispersed in water after the stand for 2 hours at 40° C. and were not dispersed in water after the stand for 1 hour at 80° C. was superior in all of the abrasion resistance, the anti-clogging property, and the image quality.

In contrast, Comparative Examples different from these were inferior in at least one of the abrasion resistance (C or lower), the anti-clogging property (D), and the image quality (D).

Specifically, in Examples 1 to 4, the abrasion resistance was better when the content of the resin-dissolving solvent in the ink was higher and the anti-clogging property was better when the content of the resin-dissolving solvent in the ink was lower.

Comparing Examples 3 and 4 with each other, the abrasion resistance was better when acyclic amide was contained as the resin-dissolving solvent, and the anti-clogging property and the wipeability were better when cyclic amide was contained as the resin-dissolving solvent.

Comparing Examples 2, 6, and 7, the abrasion resistance was better when Tg of the resin particles contained in the ink was lower, and the anti-clogging property was better when Tg of the resin particles was higher.

Comparing Examples 2, 8, and 9, the anti-clogging property was better when the average particle diameter of the resin particles contained in the ink was smaller, and the abrasion resistance was better when the average particle diameter of the resin particles was larger.

Comparing Examples 2, 10, and 11, the image quality was better when the wind speed was higher, and the hitting position deviation was smaller when the wind speed was lower.

Comparing Examples 2, 12, and 13, the image quality was better when a warm wind was used, and the anti-clogging property and the wipeability were better when a wind of a normal temperature was used. To be noted, Example 13 was an example in which the wind blowing step was also performed as the heating step by using a warm wind. In this example, the temperature of the warm wind needed to be higher than in Example 12 to make the temperature of the same recording medium the same temperature as in Example 12, and thus the anti-clogging property decreased. From this, it was found that it is preferable to use a heating step separate from the wind blowing step to keep the wind temperature of the wind blowing step lower because the image quality and the anti-clogging property are better in this case.

Comparing Examples 2, 14, and 15, the anti-clogging property was better when the temperature of the recording medium was lower, and the image quality was better when the temperature of the recording medium was higher.

Comparing Examples 2, 16, and 17, the wipeability was better when a cleaning liquid was used in the wiping step, and the wipeability was also better when the cleaning liquid contained one or more of an organic solvent and a surfactant.

Results of Comparative Examples 3 to 6 and 11 to 14 showed that the anti-clogging property was inferior in the case where the resin particles of the ink were not dispersed in water after the stand for 1 hour at 40° C.

Results of Examples 1, 2, and 5 to 10 showed that the abrasion resistance was inferior in the case where the resin particles of the ink were dispersed in water after the stand for 1 hour at 80° C.

Results of Comparative Examples 15 and 17 showed that the image quality was inferior when the wind blowing step was not used even in the case where the recording medium was heated by a platen heater. From this, it was found that it is necessary to blow wind to dry the ink attached to the recording medium from the viewpoint of achieving a good image quality.

From Comparative Example 16, it was found that a good image quality cannot be achieved in the case where a wind of a normal temperature is used without operating the platen heater.

Comparing Comparative Examples 1 and 17 with each other, it was found that the image quality is improved without affecting the anti-clogging property in the case of performing the wind blowing step by using a wind of a normal temperature.

The entire disclosure of Japanese Patent Application No. 2017-215727, filed Nov. 8, 2017 is expressly incorporated by reference herein.

What is claimed is:

1. An ink jet recording method comprising:
heating a recording medium;
attaching an aqueous ink composition to the recording medium heated in the heating by ejecting the aqueous ink composition through a nozzle, the aqueous ink composition containing water, a solvent, and resin particles; and
blowing wind to a surface of the recording medium in the attaching,
wherein the resin particles include particular resin particles that are dispersed in water after leaving a mixture liquid of the particular resin particles to stand for 2 hours at 40° C. and are not dispersed in water after leaving the mixture liquid to stand for 1 hour at 80° C., the mixture liquid containing a composition of the solvent contained in the aqueous ink composition and the particular resin particles as a resin solid component in a mass ratio of 1:1.

2. The ink jet recording method according to claim 1, wherein the solvent contains one or more kinds selected from the group consisting of polyols, alkanediols, glycol ethers, and resin-dissolving solvents.

3. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 2.

4. The ink jet recording method according to claim 1, wherein the solvent contains 65 to 100% by mass of a resin-dissolving solvent with respect to a total amount of the solvent.

5. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 4.

6. The ink jet recording method according to claim 1, wherein the resin particles include resin particles formed from a (meth)acrylic resin.

7. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 6.

8. The ink jet recording method according to claim 1, wherein an average particle diameter of the resin particles is 150 to 300 nm.

9. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 8.

10. The ink jet recording method according to claim 1, wherein a surface temperature of the recording medium in the attaching is 40° C. or lower.

11. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 10.

12. The ink jet recording method according to claim 1, wherein a wind speed of the wind at the surface of the recording medium in the blowing is 0.5 m/sec or higher.

13. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 12.

14. The ink jet recording method according to claim 1, wherein a temperature of the wind in the blowing is 35° C. or lower.

15. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 14.

16. The ink jet recording method according to claim 1, wherein the aqueous ink composition contains 1% by mass or less of an organic solvent that is a polyol having a normal boiling point of 280° C. or higher.

17. An ink jet recording apparatus comprising:
a heater that heats a recording medium;
a nozzle through which an aqueous ink composition is ejected to the recording medium; and
a wind blowing unit that blows wind to the recording medium,
wherein the ink jet recording apparatus performs recording by the ink jet recording method according to claim 1.

18. A maintenance method of a recording apparatus that performs recording by the ink jet recording method according to claim 1, the maintenance method comprising wiping, by a wiping member, a nozzle surface in which the nozzle is formed.

19. The maintenance method according to claim 18, wherein the wiping member is a cloth wiper.

20. The maintenance method according to claim 18, wherein a cleaning liquid is used in the wiping.

* * * * *